(No Model.) 5 Sheets—Sheet 1.

T. H. MÜLLER & J. W. DECASTRO.
APPARATUS FOR SEPARATING BODIES OF DIFFERENT SPECIFIC GRAVITIES.

No. 273,129. Patented Feb. 27, 1883.

(No Model.) 5 Sheets—Sheet 2.
T. H. MÜLLER & J. W. DECASTRO.
APPARATUS FOR SEPARATING BODIES OF DIFFERENT SPECIFIC GRAVITIES.
No. 273,129. Patented Feb. 27, 1883.
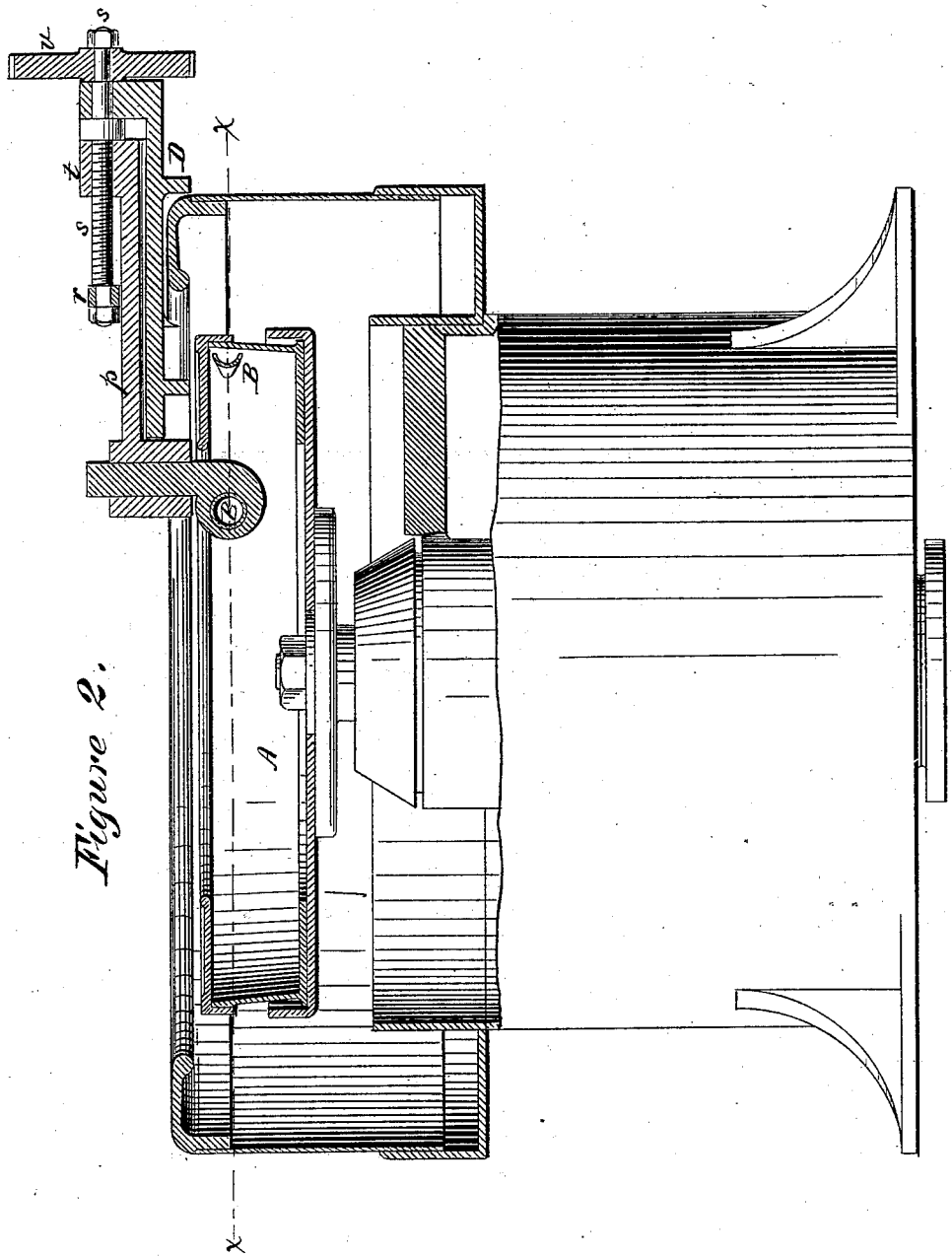

(No Model.) 5 Sheets—Sheet 3.

T. H. MÜLLER & J. W. DECASTRO.
APPARATUS FOR SEPARATING BODIES OF DIFFERENT SPECIFIC GRAVITIES.

No. 273,129. Patented Feb. 27, 1883.

(No Model.) 5 Sheets—Sheet 4.

T. H. MÜLLER & J. W. DECASTRO.
APPARATUS FOR SEPARATING BODIES OF DIFFERENT SPECIFIC GRAVITIES.

No. 273,129. Patented Feb. 27, 1883.

(No Model.) 5 Sheets—Sheet 5.

T. H. MÜLLER & J. W. DECASTRO.
APPARATUS FOR SEPARATING BODIES OF DIFFERENT SPECIFIC GRAVITIES.

No. 273,129. Patented Feb. 27, 1883.

UNITED STATES PATENT OFFICE.

TEILE H. MÜLLER AND JACOB W. DECASTRO, OF NEW YORK, N. Y.

APPARATUS FOR SEPARATING BODIES OF DIFFERENT SPECIFIC GRAVITIES.

SPECIFICATION forming part of Letters Patent No. 273,129, dated February 27, 1883.

Application filed August 25, 1882. (No model.)

*To all whom it may concern:*

Be it known that we, TEILE HENRY MÜLLER and JACOB W. DECASTRO, both of the city, county, and State of New York, have invented a new and useful Improvement in Apparatus for Separating Bodies of Different Specific Gravities, of which the following is a full, true, and exact description, reference being had to the accompanying drawings.

The object of this invention is to produce a new and useful apparatus based in principle upon a centrifugal machine, by means of which bodies of different specific gravities may be separated from each other; and the invention also relates to an improvement by means of which one of said separated bodies may be continuously removed as it is deposited without stopping the operation of the apparatus, thereby enabling the operation of depositing one body and removing another to be continuously carried on.

Figure 1:
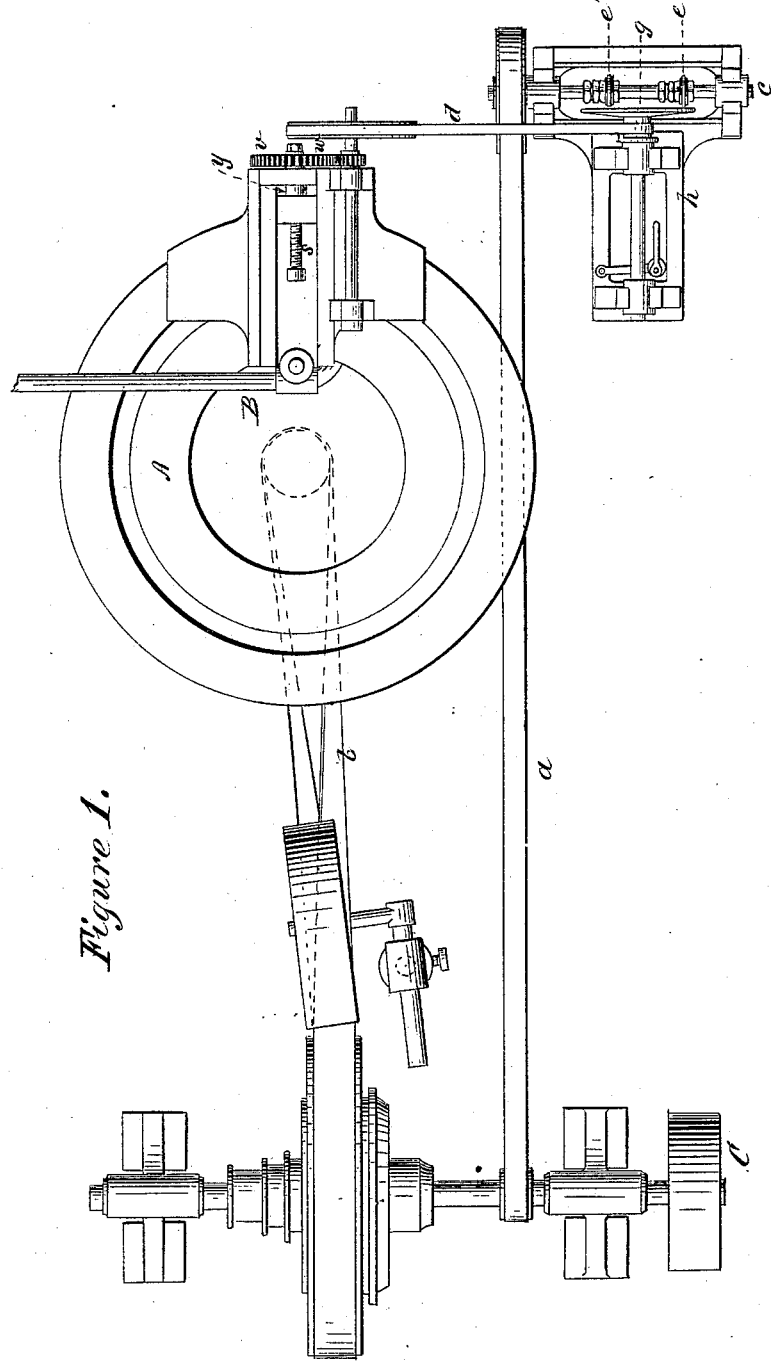
Figure 4:
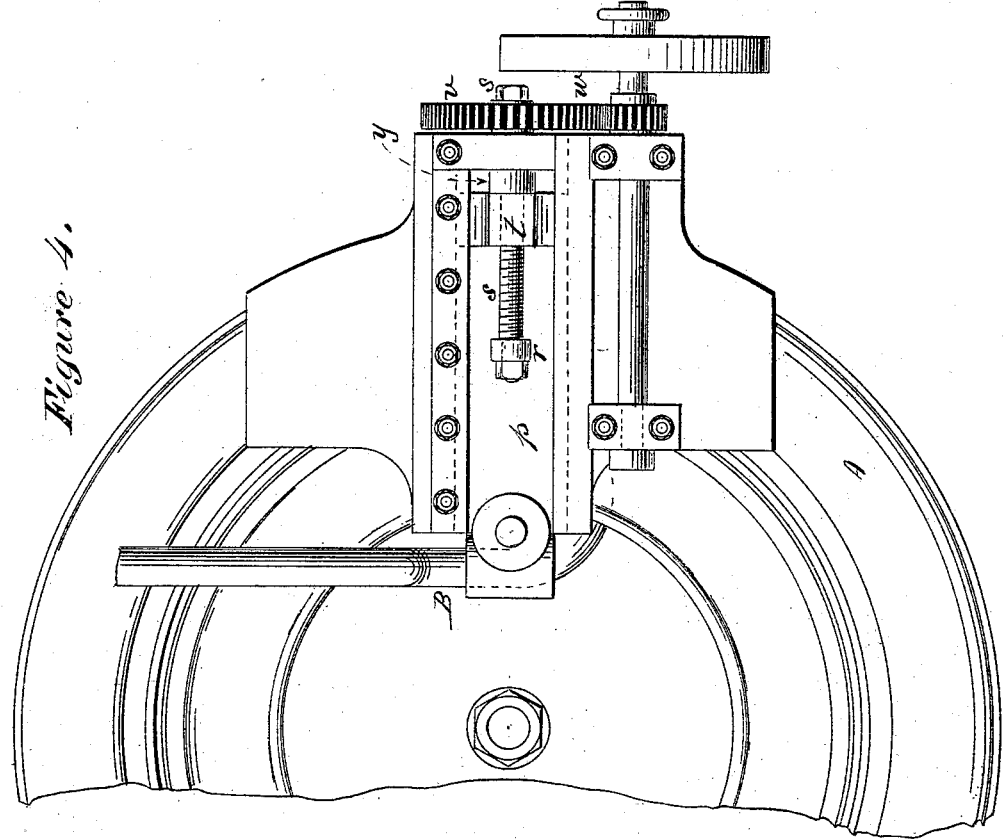
Figure 3:
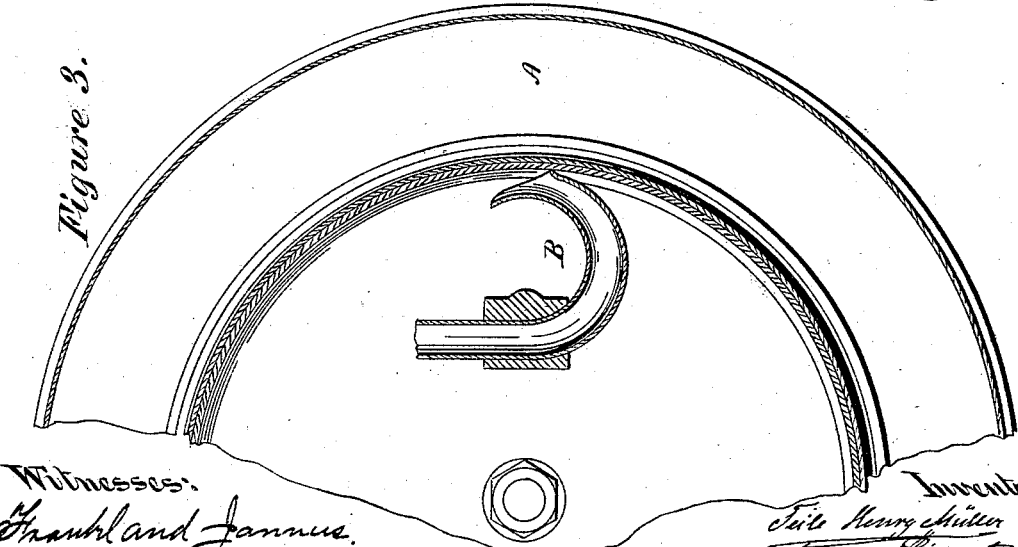
Figure 5:
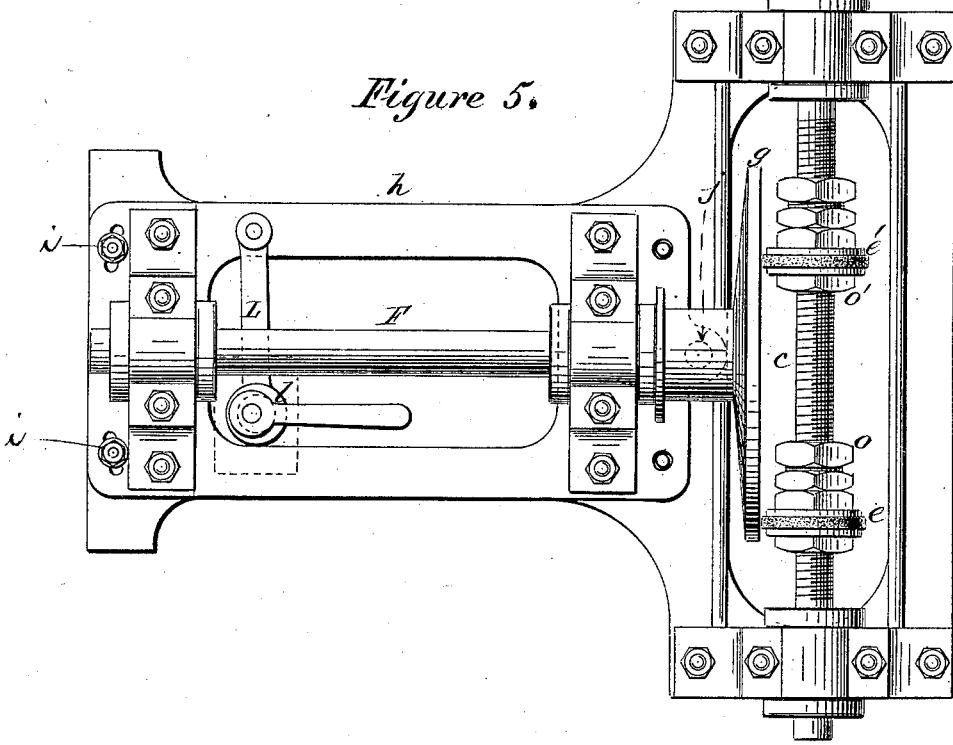
Figure 6:
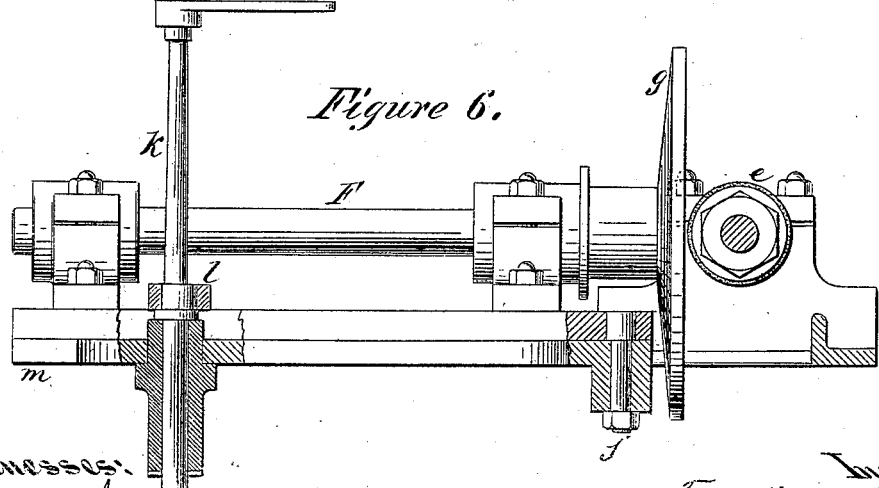
Figure 7:
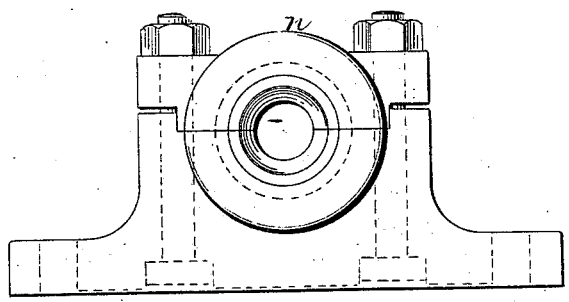
Figure 8:
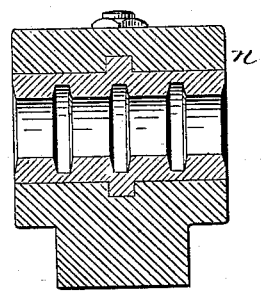
Figure 9:
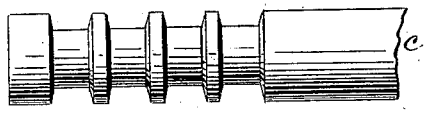
Figure 10:
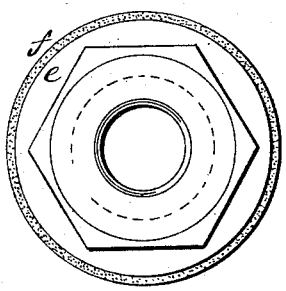
Figure 11:
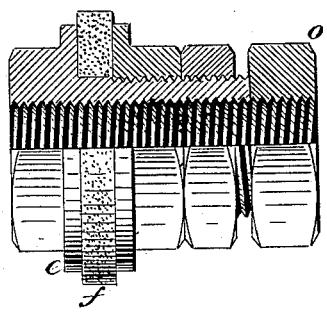

The invention will be readily understood from the accompanying drawings, in which Figure 1 represents a plan view of the entire apparatus; Fig. 2, a section through the basket of the centrifugal machine and the removing apparatus; Fig. 3, a detailed view of the cutter or removing tube, being a section through the line $x\,x$, Fig. 2; Fig. 4, a detailed view of the apparatus for adjusting the cutter; Fig. 5, a plan view of apparatus for determining the rate of motion for the cutter; Fig. 6, a view at right angles to Fig. 5, partly in section; Figs. 7, 8, 9, 10, and 11, details of the reversing and adjusting apparatus shown in Fig. 5.

The apparatus consists generally of a centrifugal machine. In the form shown one open at the top is used. This basket is driven from below, and is known generally as an "under-driven machine." This basket may be of any suitable construction, and may be arranged as a hanging basket, if preferred. An adjustable cutter or removing apparatus is provided, which, after the bodies have been separated in the basket in the manner to be described by the difference of specific gravity and the centrifugal force exerted upon them in the machine, will continuously remove that one of said bodies which is deposited toward the center of the basket or on the inside thereof.

The invention principally relates to the method of operating this cutter and to its introduction within a centrifugal machine.

In our drawings similar letters refer to similar parts.

A represents the basket of the centrifugal machine, driven from the power-shaft C by belt $b$. Attached to the support of the basket is the cutter-tube B, which is adjustable toward and from the periphery of the basket. The shape of this cutter is shown in section in Fig. 3; but we do not limit ourselves to this form. The cutter is supported upon the slide $p$, which is longitudinally adjustable on the frame or bed D. This slide, as shown, is arranged to operate in the dovetailed grooves, as shown in Fig. 4. By moving the slide inward and outward the position of the cutting-edge of B with reference to the periphery of the basket is determined. The position of the slide $p$ is determined by the screw $s$, which engages with the nut $t$, attached to and moving with the slide. The screw $s$ is supported in the frame B, and its longitudinal motion is prevented by the gear-wheel $v$ and collar $y$. By rotating the wheel $v$ in one direction the slide and the cutter will be forced inward toward the center of the basket until its motion is arrested by the stop $r$. Its motion outward would be arrested by the collar $y$.

In practical operation it is necessary that the cutter should be moved both inward and outward, and it is exceedingly desirable that its velocity of movement in both directions should be exactly determinable, and the apparatus shown is a very convenient and efficacious means of carrying out this design. This apparatus is shown in detail in Figs. 5, 6, 7, 8, 9, 10, and 11. It consists generally of a power-shaft, $c$, driven by belt $a$ from the main shaft C. Upon this shaft are two friction-disks, $e\,e'$, the bearing-surfaces of which are preferably made of leather, though other suitable material might be employed. These disks are clearly shown in Fig. 5, and their position longitudinally upon the shaft C is readily determined by securing them upon said shaft and locking them, when located, by lock-nuts $o$. These disks engage with the metallic disk $g$, which can be brought in contact with either one or the other of them at will. This disk $g$ is mounted upon a shaft, F, supported in a frame, $h$. The frame $h$ is pivoted at one end on the fixed fulcrum *j*, while its other end is held against the slide-rest by the nuts *i*, the bolts of which pass through slots in the adjustable frame. It will thus be apparent that by swinging the frame *h* about the pivot *j* either one or the other of the disks *e e'* can be brought in contact with the disks *g* at will. The position of this frame *h* is determinable by the eccentric *l*. This eccentric is connected by link L to the frame *h*, and by means of it that frame can be swung in either direction. Of course many other devices might be used; but the one here shown is very convenient, for by means of it the disk *g* can be caused to revolve in either direction, and its motion in either direction can be independently regulated, so that it may move faster when moving in one direction than when it moves in the other, which, under certain circumstances, is desirable in the practical operation of the apparatus. We prefer to support the shaft *c* at its end by means of the thrust-rings shown in Figs. 7, 8, and 9. The upper half of the bearing *n* is removable to allow the placing of these rings in position in the well-known manner.

The operation of our apparatus can now be readily understood. Supposing it to be desired to separate starch-water containing starch and gluten, so as to deposit the starch in the machine and remove the gluten and water therefrom, the machine may be operated as follows: The basket is put in motion and the eccentric *l* is so located that neither wheel *e* nor *e'* comes in contact with the disk *g*, which consequently remains stationary. A suitable amount of liquid is then allowed to flow into the bottom of the basket by means of a suitable tube. Thence it goes directly to the periphery of the basket and there forms a hollow cylinder, the starch particles going to the outside or against the periphery of the basket and the liquid and gluten standing on the inside thereof. The cutter should then be moved by its feed-screw as close as possible to the periphery of the basket, and the starch-water should be allowed to flow freely into the basket, care being taken to regulate the feed according to the capacity of the machine. The eccentric is then so operated as to cause the screw *s* to be turned in the direction which will cause the gradual withdrawal of the cutter from the periphery of the basket. The proper velocity of this movement can be readily determined by experiment by means of adjusting the friction-disk *e'* to the proper position. The liquid deposited upon the bottom of the basket will flow rapidly to the edge and then upward upon the side until it meets the cutter, which is located as close as possible to the upper corner of the basket. During the upward flow of the liquid the larger part of the starch is deposited partly by centrifugal force direct and partly by a peculiar property of the starch globules to be retained by formerly-deposited starch-surfaces, while the gluten, which is more slippery, is carried along by the current and removed from the machine by the scraper, together with the superfluous liquor which stands within the starch-ring. It will therefore easily be seen that the speed of the scraper should depend upon the amount of deposit in the machine. As soon as the basket is filled with pure starch the feed motion of the scraper is stopped and the cock closed, so as not to admit any more liquor. The scraper is now turned back, so as just to enter the surface of the starch-ring, and a small amount of water admitted into the machine. This washes off any gluten or impurities that may have adhered to the surface of the starch and the impurities and the water escape through the scraper, leaving the starch dry and clean. If it is desired to remove the starch in a liquid form from the machine, the scraper is now made to move toward the rim of the basket from the axis by throwing the other friction-disk, *e*, in contact with the disk *g*, and the starch is washed up by means of a jet of water issuing from a hose-nozzle or other suitable contrivance. In this operation care must be taken not to admit more water than can be constantly removed from the basket by the scraper, as any superfluous liquid in the basket would be the cause of undue oscillations in the apparatus. For purposes where the starch is to be used dry it may be removed from the basket by the same means as are used for removing sugar from similar machines, and the machine should then be made with openings in the bottom in the well-known way. The gluten and water which are removed from the basket in the practical operation of this machine can be preserved when it is desired to employ the gluten for other purposes or to dry the same.

The process of separating gluten from starch by the means specified is not claimed in this application, the said process forming the subject of an independent application, and neither is a centrifugal machine provided with a cutter stationary during the operation of the machine broadly claimed as new. We do not in this application claim the process described, intending to make a separate application therefor; but What it is desired to claim and secure by Letters Patent is—

1. A centrifugal machine provided with a cutter or removing apparatus projecting toward its periphery and adapted to be removed inward from the periphery toward the center, in combination with apparatus whereby such movement may be automatically effected during the operation of the machine, substantially as described.

2. A centrifugal machine provided with a cutter or removing apparatus projecting toward the periphery of the basket and having its cutting-edge located above the bottom of the basket, and itself made automatically movable during the operation of the machine, substantially as described.

3. The combination, with the basket of a centrifugal machine, of a cutter supported upon a slide or equivalent, and a screw operating said slide and driven from the power operating the basket, whereby the position of the cutting-edge may be automatically varied during the operation of the apparatus, substantially as described.

4. The combination, in a centrifugal machine, of a cutting-edge made automatically adjustable with reference to the periphery of the basket, and mechanism whereby the speed of the movement of the cutting-edge may be varied, substantially as described.

5. The combination, in a centrifugal machine, of a cutting-edge made automatically adjustable with reference to the periphery of the basket, and a reversing-gear between the power and said cutting-edge, whereby the cutting-edge may be automatically advanced toward or withdrawn from the periphery of the basket, substantially as described.

6. The combination of the disk $g$ and the friction-disks $e\ e'$, whereby the motion of the disk $g$ may be reversed, substantially as described.

7. The combination of the disk $g$ and adjustable disks $e\ e'$, whereby the motion of the disk $g$ may be reversed and its speed in either direction exactly determined, substantially as described.

8. A centrifugal machine provided with a delivery-pipe delivering the material to be separated upon the bottom of the basket, and a cutter or removing apparatus extending toward the periphery of the basket and having its cutting-edge located above the bottom of the basket for the purpose of allowing a separation of the deposited material before the cutter or removing contrivance acts upon it, substantially as described.

9. A centrifugal machine provided with a curved tube extending from the interior toward the periphery for the purpose of receiving and removing deposited material and conveying it to some other location, said tube being made automatically movable during the operation of the basket, substantially as described.

TEILE HENRY MÜLLER.
J. W. DECASTRO.

Witnesses:
GEO. H. EVANS,
ANTHONY GREF, Jr.